United States Patent [19]
Lau

[11] Patent Number: 5,180,285
[45] Date of Patent: Jan. 19, 1993

[54] CORROSION RESISTANT MAGNESIUM TITANATE COATINGS FOR GAS TURBINES

[75] Inventor: Sai K. Lau, E. Amherst, N.Y.

[73] Assignee: Westinghouse Electric Corp., Pittsburgh, Pa.

[21] Appl. No.: 637,913

[22] Filed: Jan. 7, 1991

[51] Int. Cl.$^5$ .................. B63H 1/26; C25D 11/02; C03C 27/02

[52] U.S. Cl. .................. 416/241 B; 415/200; 428/697; 428/701; 428/472; 428/629; 428/632; 428/633

[58] Field of Search ........... 428/697, 699, 701, 472, 428/472.1, 472.2, 629, 632, 633; 416/241 R, 241 B, 229 R; 415/200

[56] References Cited

U.S. PATENT DOCUMENTS

| | | | |
|---|---|---|---|
| 3,758,233 | 9/1973 | Cross | 416/229 |
| 3,956,531 | 5/1976 | Church et al. | 427/226 |
| 4,055,705 | 10/1977 | Stecura | 428/633 |
| 4,273,824 | 6/1981 | McComas | 428/256 |
| 4,576,874 | 3/1986 | Spengler | 428/623 |
| 4,844,943 | 7/1989 | Chassagneux | 427/34 |
| 4,916,022 | 4/1990 | Solfest | 428/623 |
| 4,927,714 | 5/1990 | Priceman | 428/628 |
| 4,996,117 | 2/1991 | Chu et al. | 428/472 |

FOREIGN PATENT DOCUMENTS

| | | | |
|---|---|---|---|
| 0282831 | 9/1988 | European Pat. Off. | 416/241 R |
| 0151771 | 11/1981 | German Democratic Rep. | 428/697 |
| 2-298603 | 12/1990 | Japan | 416/241 B |

OTHER PUBLICATIONS

*Zirconia thermal barrier coatings*, Bratton, R. J. and Lau, S. K., Proceedings of First Int'l Conf. on Science and Technology of Zirconia, Cleveland, Ohio, Jun. 16-18, 1980, p. 233.

Hodge, P. E. et al., "Thermal Barrier Coatings; Burner Rig Hot Corrosion Test Results", DOE/NASA/25-93-78/3, NASA Rm—79005, 1978, p. 10.

Vogan, J. W. and Stetson, A. R., "Advanced Ceramic Coating Development for Industrial/Utility Gas Turbines," DOE/NASA Contract DEN3-109, DOE Quarterly Review, Mar. 4, 1980 and Oct. 13, 1981.

Bratton, R. J. Lau, S. K. Lee, S. Y., and Anderson, C. A., "Ceramic Coating Evaluations and Development," in *Proceedings of the First Conference on Advanced Materials for Alternative Fuel Capable Directly Fired Heat Engines*, Castine, Maine, Jul. 31, to Aug. 3, 1979.

Bratton, R. J., Singhal, S. C., Lee, S. Y., "Ceramic Gas Turbine Components Research and Development, Part 2-Evaluation of $ZrO_2Y_2O_3$/Thermal Barrier Coatings Exposed to Simulated Gas Turbine Environments," Final Report, EPRI Contract RP 421-1, Jun. 1978.

"Engineering Properties of Selected Ceramic Materials," Lynch, J. F. et al., The American Ceramic Society, Inc., 1966.

*Primary Examiner*—Thomas E. Denion

[57] ABSTRACT

A ceramic protective coating system and process for applying the same is provided for superalloy base metal turbine components which are subjected to elevated exhaust temperatures and which exist in a corrosive fluid environment due to the use of fuels which form corrosive compounds upon combustion. The ceramic overcoat consists of at least one protective magnesium titanate of the group $MgTiO_3$ and $Mg_2TiO_4$.

10 Claims, 2 Drawing Sheets 5,180,285

CORROSION RESISTANT MAGNESIUM TITANATE COATINGS FOR GAS TURBINES

FIELD OF THE INVENTION

This invention relates generally to ceramic coating systems for gas turbine component surfaces. More specifically, the invention relates to protective multi-layer ceramic coatings for the protection of the superalloy components found in gas turbines against nocuous chemical corrodants and thermal exposure.

BACKGROUND OF THE INVENTION

Ceramic coatings which can improve industrial and aircraft gas turbine performance and durability have been studied for the past forty years. Since gas turbine engines operate at relatively high temperatures, to enhance their energy output, ceramic coatings have been applied to the turbine component base metal to enhance its corrosion resistance and mechanical durability. These coatings also act as thermal barriers to protect the base metallic alloy for prolonged service life. The need exists for a ceramic coating which possesses the desired chemical and physical properties for proper functioning in gas turbines which burn low grade fuels and which subject the turbine component to high temperatures and associated stresses.

In the past, plasma sprayed yttria-stabilized zirconia compositions have been of interest to researchers. Bratton, R. J. and Lau, S. K., "Zirconia Thermal Barrier Coating," *Proceedings of First Int'l Conference on the Science and Technology of Zirconia*, Cleveland, Ohio, Jun. 16–18, 1980; U.S. Pat. No. 4,055,705. However, these coatings were found to encounter serious coating spalling problems when exposed to combustion environments that contained impurities such as sulfur, sea salt, and vanadium. Although research still continues in the area of these yttria-stabilized zirconia coatings, for example U.S. Pat. No. 4,916,022, there is a need for other candidate materials.

An acceptable ceramic overcoat material must exhibit high chemical stability, along with a high thermal expansion coefficient. The ceramic overcoat material should also have thermal expansion properties similar to the bond coat which is usually MCrAlY or a diffusion aluminide. If the thermal expansion properties are too dissimilar, then the resulting stresses which arise during the cyclic heating cycle could impair performance of the turbine component.

Among the refractory materials, some mixed oxides are known to exhibit high thermal expansion coefficients. "Engineering Properties of Selected Ceramic Materials," Lynch, J. F., et.al., ed., The American Ceramic Society, Inc., 1966. Research has been conducted on calcium silicate, but due to its reaction with sulfur to form $CaSO_4$, the test results were unsatisfactory. However, refractory titanates have been found to also provide a viable alternative.

A recent study was conducted to determine the superior coating candidate from the group consisting of $ZrO_2*Y_2O_3$, $Al_2O_3*MgO$, $ZrO_2*MgO$, $Ca_2SiO_4$, and $CaTiO_3$. Vogan, J. W. and Stetson, A. R., "Advanced Ceramic Coating Development for Industrial/Utility Gas Turbines," DOE Quarterly Reviews, Mar. 4, 1980 and Oct. 13, 1981. The best candidate was determined to be the $CaTiO_3$ compound for corrosion resistance to $Na_2SO_4$ and $NaVO_3$. However, the $CaTiO_3$ compound was found to exhibit excessive erosion damage and reacted with magnesium oxide, a fuel additive, as well. Therefore, a new candidate was needed with long term stability characteristics.

In view of the foregoing, there exists a need to provide a new ceramic coating material which exhibits a high thermal expansion coefficient and is nonreactive with corrosive combustion impurities which are present when low grade fuels containing vanadium and sulfur are utilized. It has been discovered that $MgTiO_3$ and $Mg_2TiO_4$ are uniquely the best coating materials available among the refractory titanates for fulfilling this need. Although titanium oxides and magnesium oxides have been employed in the coatings for metal surfaces, the mixed or binary magnesium titanium oxides are novel coatings for protecting the metal surface from corrosive wear. U.S. Pat. No. 4,844,943 discloses the use of magnesium oxides and titanium oxides for protection of metal surfaces from vanadosodic corrosion. However, in such reference the mixed or binary magnesium titanium oxides are not discussed or suggested; only the separate, or single, magnesium and titanium oxides are suggested, and the oxides are formed in situ. U.S. Pat. No. 4,916,022 discloses the use of a titanium oxide, but its use is to enhance the bonding between the MCrAlY and the ceramic overcoating layer and to slow the growth of the alumina scale on the MCrAlY coating layer.

The need for superior ceramic overcoat layers in the industrial gas turbine field is continuing. The prolonging of the useful life of turbine components by protecting the metal substrates from nocuous chemical corrodant attack saves on repair costs, plant down-time, and replacement costs. Furthermore, the coating system imparts thermal insulation to the base metal alloy of the turbine component.

SUMMARY OF THE INVENTION

It is therefore an object of the present invention to provide a new and improved ceramic based coating system for protecting gas turbine components from severe wear due to exposure to corrodants found in the combustion fluids of low grade fuels. This ceramic coating system also provides added thermal insulation between hot gases and turbine components to reduce component temperature for improved turbine efficiency and prolonged service life.

A further object of the present invention is to provide improved methods for protecting the metallic substrates found in gas turbine engines.

The present invention relates to an article of manufacture exhibiting wear and corrosion resistance at elevated temperatures such as those found in a gas turbine engine. The gas turbine component comprises a nickel base superalloy substrate. A metallic, aluminum oxide forming bond coating is deposited onto the substrate. This bond coating is selected from the group consisting of MCrAlY, diffusion aluminides, and combinations thereof. Deposited onto the bond coating is an oxidative overcoat. This overcoat comprises at least one protective magnesium titanate of the group consisting of $MgTiO_3$ and $Mg_2TiO_4$.

The present invention can contain an optional graded overcoat layer located between the bond layer and the overcoat layer. The graded overcoat layer consists of at least one bond coating compound and at least one protective magnesium titanate where the bond coating compound is selected from the group consisting of MCrAlY, diffusion aluminides. and combinations thereof and the protective magnesium titanate is selected from the group consisting of MgTiO$_3$ and Mg$_2$TiO$_4$.

The present invention also consists of a process for protecting a metallic surface, used at gas combustion temperatures, from corrosion due to the presence of nocuous chemical corrodants found in fuels. The process comprises providing a metallic surface and depositing on that surface a thin metallic, aluminum oxide forming bond coating from the group consisting of MCrAlY, diffusion aluminides, and combinations thereof. Deposited onto the bond coating is a layer of at least one protective magnesium titanate of the group consisting of MgTiO$_3$ and Mg$_2$TiO$_4$. The process also provides for the depositing of an optional graded oxide overcoat layer between the bond layer and the protective magnesium titanate layer. The graded overcoat layer consists of a combination of at least one bond coating material and at least one protective magnesium titanium oxide.

BRIEF DESCRIPTION OF DRAWINGS

A better understanding of the present invention may be obtained by reference to the drawing provided when viewed in light of the detailed description of the invention.

DESCRIPTION OF THE PREFERRED EMBODIMENT

Figure 1:
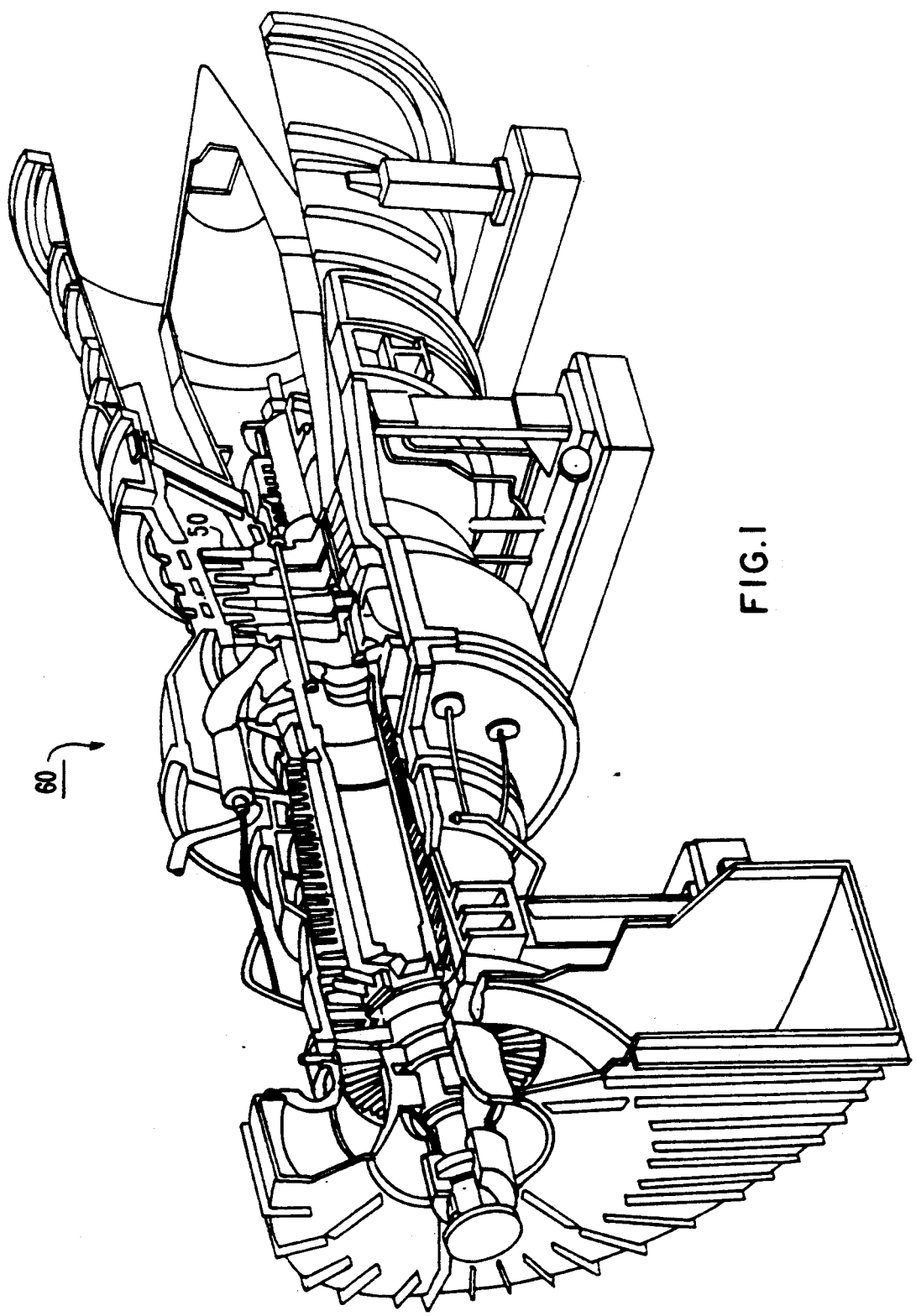
FIG. 1 is a turbine engine showing a cross sectional view disclosing a plurality of turbine components.

It has been found that these magnesium titanate coatings of the present invention withstand reactions with the SO$_3$(g) compound present in the turbine fuel exhaust. The MgTiO$_3$ and Mg$_2$TiO$_4$ compounds will not react with the SO$_3$(g) compound until the partial pressure of SO$_3$(g) is higher than 0.12 and 0.09 atm., respectively, at 1200K, as shown in Table 1. These partial pressures of SO$_3$(g) are about 10$^2$ to 10$^4$ times higher than the normal SO$_3$(g) pressures found in the utility gas turbines. These magnesium titanate coatings will also withstand exposure to sodium sulfate in the presence of SO$_3$(g). Furthermore, the magnesium titanate coatings do not react with NaVO$_3$(l) since such reactions would cause a positive free energy change. The magnesium titanate compounds can be employed in a system which utilizes a magnesium additive to convert liquid V$_2$O$_5$ into solid Mg$_3$V$_2$O$_8$, since the magnesium titanate compounds will not react with the Mg$_3$V$_2$O$_8$ deposit. Therefore, the magnesium titanates may be used in a system which employs vanadium contaminated fuels as well.

TABLE 1

| | Thermodynamic Reactivities of Titanates Toward Various Gas Turbine Corrodants | | | | |
|---|---|---|---|---|---|
| | Titanate | | | | |
| Reactant | CaTiO$_3$ | BaTiO$_3$ | SrTiO$_3$ | MgTiO$_3$ | Mg$_2$TiO$_4$ |
| SO$_3$ (g)[1] | 2.4 × 10$^{-5}$ | 1.1 × 10$^{-6}$ | 5 × 10$^{-5}$ | 0.12 | 0.09 |
| Na$_2$SO$_4$ (l)[1] (in SO$_3$ (g)) | 9 × 10$^{-5}$ | 8.2 × 10$^{-7}$ | 2.4 × 10$^{-4}$ | 32.5 | 0.46 |
| NaVO$_3$ (l) | N | NA | NA | N | N |
| V$_2$O$_5$ (l) | R | NA | NA | R | R |
| Mg$_3$V$_2$O$_8$ | R | NA | NA | N | N |
| MgSO$_4$ | R | R | R | N | N |

R - Thermodynamically Reactive
N - Thermodynamically Nonreactive
NA - Thermodynamic data not available
Note 1: For reactions involving SO$_3$ (g), values listed are equilibrium pressure of SO$_3$ (g) (atm) at 1200° K. When actual pressure of SO$_3$ (g) exceeds the equilibrium value, reaction will be thermodynamically favorable.

The improved performance of the magnesium titanium oxides as contrasted to other titanium oxides is shown in Table 1. The other titanium oxides will react with SO$_3$(g) at very low partial pressures of SO$_3$(g) as opposed to the relatively high partial pressure of SO$_3$(g) necessary for a favorable reaction with the magnesium titanium oxides. Since the usual partial pressure of SO$_3$(g) found in utility gas turbines is on the order of 10$^{-5}$ to 10$^{-4}$ atm. when burning fuels containing 0.1 to 1 wt % sulfur, reaction of the CaTiO$_3$, BaTiO$_3$, and SrTiO$_3$ coating materials could occur. It can also be seen from Table 1 that the magnesium titanium oxides are much more stable than the other refractory titanates when exposed to possible corrodants such as Na$_2$SO$_4$, MgSO$_4$, and Mg$_3$V$_2$O$_8$. Although the magnesium titanates are reactive with V$_2$O$_5$(l), as stated above, if the fuel is treated with a magnesium additive, then the magnesium titanate coatings will not react with the Mg$_3$V$_2$O$_8$ corrosive deposit.

Figure 2:
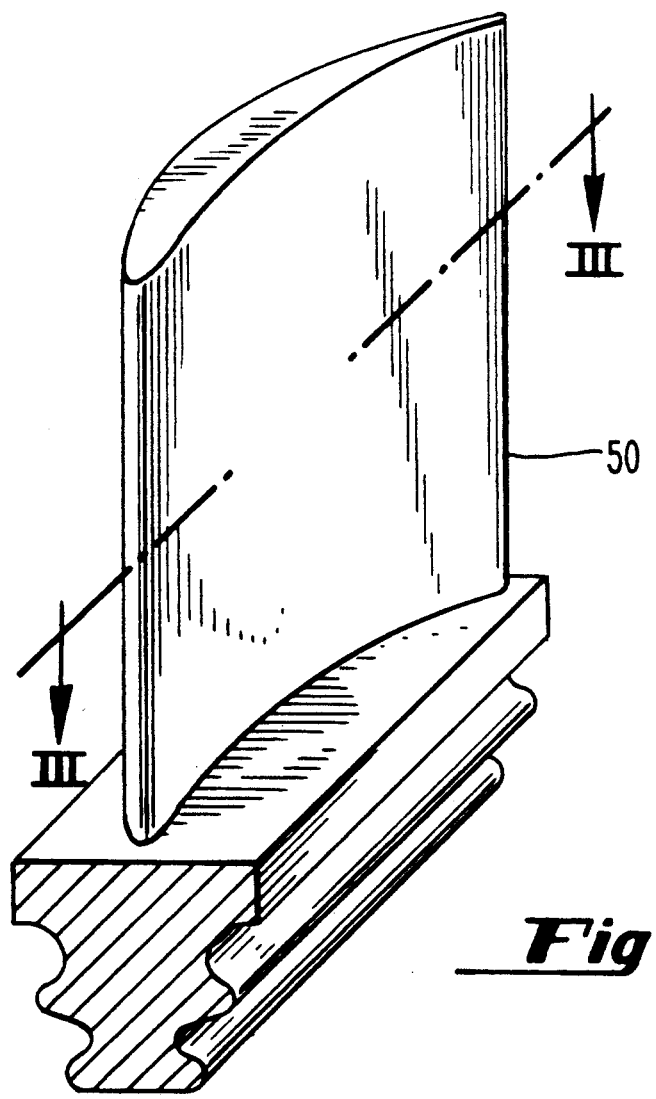
FIG. 2 is an enlarged view of a representative turbine component, shown here as a turbine blade.
Figure 3:
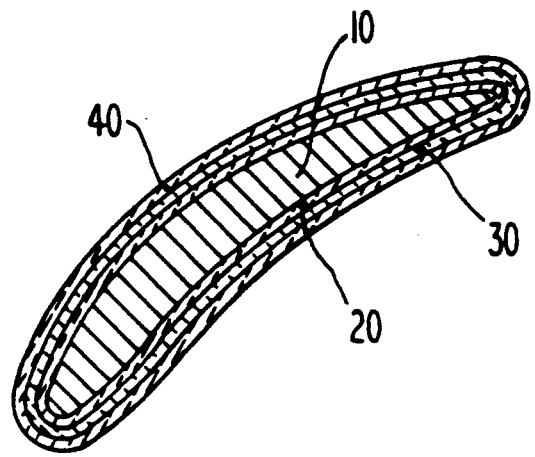
FIG. 3 is an enlarged partial cross sectional view taken through lines III—III shown in FIG. 2 of a turbine component, shown here as a turbine blade, illustrating the several layers of the present inventive coating system.

Reference is now made to FIG. 1, in which a turbine engine 60 is shown disclosing a plurality of turbine components and in order to further illustrate the present invention, turbine component 50 is shown. In FIG. 2 an enlarged view is shown of the turbine component 50, which has been illustrated in this case by a turbine blade. Reference is now made to FIG. 3, in which the turbine component 50 is shown in cross-section taken through lines III—III shown in FIG. 2 to illustrate the various layers 20, 30, 40 which may be applied to the metallic substrate 10.

The metallic substrate 10 is composed either of a nickel-based superalloy or cobalt-based superalloy known in the art. Other substrates may contain iron, chromium, molybdenum or mixtures thereof. Also, the different stainless steels can be protected by the present invention. The preferred metallic substrate is a nickel-based superalloy.

In accordance with the present invention, and as is known in the prior art, a metallic bond layer 20 is deposited onto the metallic substrate 10. This metallic bond layer 20 forms an aluminum oxide coating which facilitates the deposition of the protective oxide coatings 30, 40 to the metallic substrate 10.

The metallic bond layer 20 is selected from the group consisting of MCrAlY, diffusion aluminides, and combinations thereof. The compound MCrAlY is a generic term well known in the art to represent metallic bond layer alloys. In the alloy MCrAlY, M can represent any of the group consisting of nickel, iron, cobalt, and mixtures thereof, and Y can represent such elements as yttrium, lanthanum, and hafnium. Such alloys are well known in the prior art and are described in U.S. Pat. No. 4,916,022 which is incorporated herein by reference.

The metallic bond layer 20 can be deposited by any known process. Examples include such processes as evaporation under vacuum, by projection of plasma spray and by chemical reaction. Reference is made to the techniques described in U.S. Pat. Nos. 4,844,943 and 4,916,022 which are incorporated herein by reference.

This invention also contemplates the use of an optional graded oxide overcoat 30. This graded oxide overcoat may be employed to minimize problems which may arise due to the differences in thermal expansion properties between the metallic bond layer 20 and the oxide overcoat 40.

The graded oxide overcoat 30 is comprised of a mixture of at least one bond coating agent and at least one protective magnesium titanate where the bond coating agents consist of MCrAlY and diffusion aluminides and the protective magnesium titanates consist of $MgTiO_3$ and $Mg_2TiO_4$. This graded oxide overcoat 30 can be applied to the metallic bond layer 20 by the same means discussed above for the deposition of the metallic bond layer 20.

In accordance with the present invention, an oxide overcoat 40 is deposited onto the metallic bond layer 20, or optionally to the graded oxide overcoat 30 if that layer is employed, in order to protect the turbine component 50 from the corrosive fluids which are present in the combustion exhaust of a turbine engine. The oxide overcoat 40 consists of at least one of the protective magnesium titanate compounds of the group consisting of $MgTiO_3$ and $Mg_2TiO_4$.

The magnesium titanate which is present in the oxide overcoat 40 protects the turbine component 50 from the corrosive effects due to the exposure to nocuous, corrosive exhaust fluids present in turbine engines. The existence of such corrosive fuel combustion impurities such as sulfur and vanadium compounds at the elevated temperatures present in the turbine exhaust system, create an extremely corrosive atmosphere for unprotected turbine components. The deposition of the oxide overcoat 40 containing at least one magnesium titanate compound is thought to greatly enhance the corrosion resistance of the turbine component 50.

Another benefit of the magnesium titanate compound overcoat is to provide thermal insulation between hot combustion gases and the base metal alloy turbine components. Therefore, the turbine component can be operated at a lower temperature for prolonged service life. Optionally, the combustion temperature can be increased without a corresponding increase in turbine component temperature. An additional benefit is that turbine component cooling can be reduced due to the thermal barrier imposed by the magnesium titanium oxide overcoat.

What is claimed is:

1. In a gas turbine engine, an article of manufacture exhibiting wear and corrosion resistance and thermal protection at elevated temperatures found in a gas turbine engine comprising:
    (a) a nickel base superalloy substrate;
    (b) a metallic, aluminum oxide forming bond coating selected from the group consisting of MCrAlY, diffusion aluminides, and combinations thereof; and
    (c) an oxidative overcoat deposited upon said bond coating, said overcoat comprising at least one protective magnesium titanate of the group consisting of $MgTiO_3$ and $Mg_2TiO_4$.

2. An article of manufacture exhibiting wear and corrosion resistance and thermal protection at elevated temperatures found in a gas turbine engine comprising:
    (a) a nickel base superalloy substrate;
    (b) a metallic, aluminum oxide forming bond coating selected from the group consisting of MCrAlY, diffusion aluminides, and combinations thereof;
    (c) a graded oxide overcoat deposited on said bond coating comprising a combination of at least one bond coating agent and at least one protective magnesium titanate, wherein said bond coating agent is selected from the group MCrAlY, diffusion aluminides, and combinations thereof, and said protective magnesium titanate is selected from the group $MgTiO_3$ and $Mg_2TiO_4$; and
    (d) an oxidative overcoat deposited upon said graded overcoat, said oxidative overcoat comprising at least one protective magnesium titanate of the group consisting of $MgTiO_3$ and $Mg_2TiO_4$.

3. A process for protecting the metallic surface of components, used in a gas turbine at gas combustion temperatures, wherein said surfaces are protected from corrosion due to the presence of nocuous chemical corrodants found in fuels, said process comprising:
    (a) depositing on each said metallic surface a thin, metallic, aluminum oxide forming bond coating comprising at least one of the group consisting of MCrAlY, diffusion aluminides, and combinations thereof; and
    (b) depositing on said bond coating a layer of at least one protective magnesium titanate of the group consisting of $MgTiO_3$ and $Mg_2TiO_4$.

4. The process of claim 3, wherein at least one of said metallic surfaces is a nickel base superalloy.

5. The process of claim 3, wherein at least one of said metallic surfaces is stainless steel.

6. A process for protecting a metallic surface of a component used in a gas turbine at gas combustion temperatures, from corrosion due to the presence of nocuous chemical corrodants found in fuels, which comprises the following steps:
    (a) providing a component having a metallic surface in a gas turbine;
    (b) depositing on said metallic surface a thin, metallic, aluminum oxide forming bond coating comprising at least one of the group consisting of MCrAlY, diffusion aluminides, and combinations thereof;
    (c) depositing on said bond coating a graded oxide overcoat comprising a combination of at least one bond coating agent and at least one protective magnesium titanate where said bond coating agent is selected from the group MCrAlY, diffusion aluminides, and combinations thereof, and said protective magnesium titanate is selected from the group $MgTiO_3$ and $Mg_2TiO_4$; and (d) depositing on said graded oxide overcoat a protective magnesium titanate of the group consisting of $MgTiO_3$ and $Mg_2TiO_4$.

7. The process of claim 6 wherein said metallic surface is a nickel based superalloy.

8. The process of claim 6 wherein said metallic surface is stainless steel.

9. A gas turbine having a plurality of components having metallic surfaces each of said components being subject to gas combustion temperatures and corrosion due to the presence of nocuous chemical corrodants, each of said components comprising:

(a) a nickel base superalloy substrate;
(b) a metallic, aluminum oxide forming bond coating selected from the group consisting of MCrAlY, diffusion aluminides, and combinations thereof; and
(c) an oxidative overcoat deposited upon said bond coating, said overcoat comprising at least one protective magnesium titanate of the group consisting of $MgTiO_3$ and $Mg_2TiO_4$.

10. A gas turbine having a plurality of components having metallic surfaces each of said components being subject to gas combustion temperatures and corrosion due to the presence of nocuous chemical corrodants, each of said components comprising:

(a) a nickel base superalloy substrate;
(b) a metallic, aluminum oxide forming bond coating selected from the group consisting of MCrAlY, diffusion aluminides, and combinations thereof;
(c) a graded oxide overcoat deposited on said bond coating comprising a combination of at least one bond coating agent and at least one protective magnesium titanate, wherein said bond coating agent is selected from the group MCrAlY, diffusion aluminides, and combinations thereof, and said protective magnesium titanate is selected from the group $MgTiO_3$ and $Mg_2TiO_4$; and
(d) an oxidative overcoat deposited upon said graded overcoat, said oxidative overcoat comprising at least one protective magnesium titanate of the group consisting of $MgTiO_3$ and $Mg_2TiO_4$.

* * * * *